United States Patent [19]
Bell, Jr. et al.

[11] 4,056,702
[45] Nov. 1, 1977

[54] ELECTRICAL DISCHARGE MACHINING POWER CIRCUIT

[75] Inventors: Oliver A. Bell, Jr., Mooresville; Randall C. Gilleland, Troutman; Davey J. Chance, Concord, all of N.C.

[73] Assignee: Colt Industries Operating Corporation, New York, N.Y.

[21] Appl. No.: 644,447

[22] Filed: Dec. 29, 1975

[51] Int. Cl.² .................................................. B23P 1/08
[52] U.S. Cl. .................. 219/69 C; 307/270; 328/67
[58] Field of Search ............. 219/69 C, 69 M, 69 P, 219/69 G; 328/62, 67; 307/270, 243

[56] References Cited
U.S. PATENT DOCUMENTS

| 3,777,102 | 12/1973 | Bell | 219/69 C |
| 3,854,026 | 12/1974 | Bell et al. | 219/69 C |
| 3,916,138 | 10/1975 | Pfau | 219/69 C |

Primary Examiner—Bruce A. Reynolds
Attorney, Agent, or Firm—Harry R. Dumont

[57] ABSTRACT

A power supply circuit particularly useful in a multiple gap or a multiple electrode system in which multiple electrodes and a common workpiece or multiple electrodes and a like number of workpieces are selectively connected in circuit with a common DC source power supply circuit. A switching system is further provided for reversing the polarity of electrode relative to workpiece. A power supply circuit itself incorporates a specialized push-pull drive stage effective to drive the output stages in either polarity setting in such manner as to allow for negligible noise in the system. The drive system is one which generates triggering pulses effective to switch the output transistor bank in either polarity very rapidly and independently of the number of output leads which may be included.

6 Claims, 4 Drawing Figures

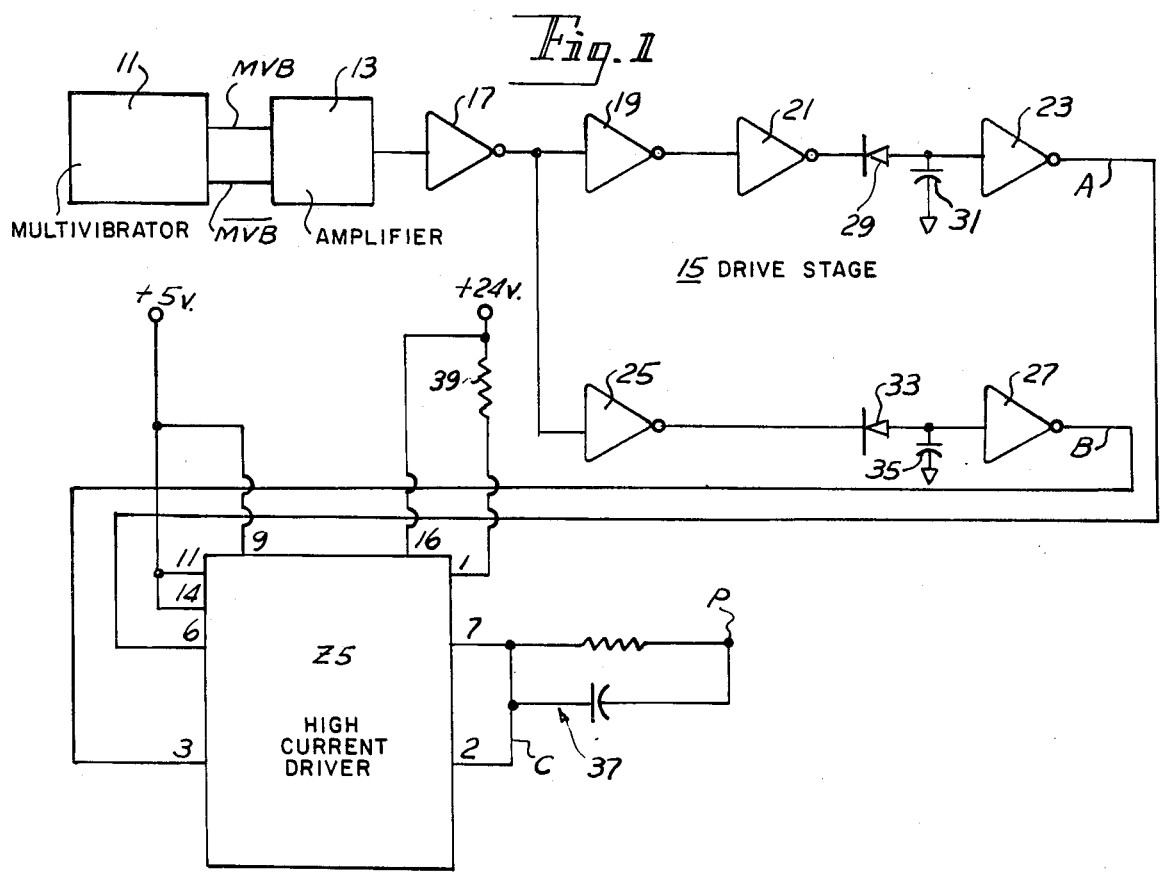
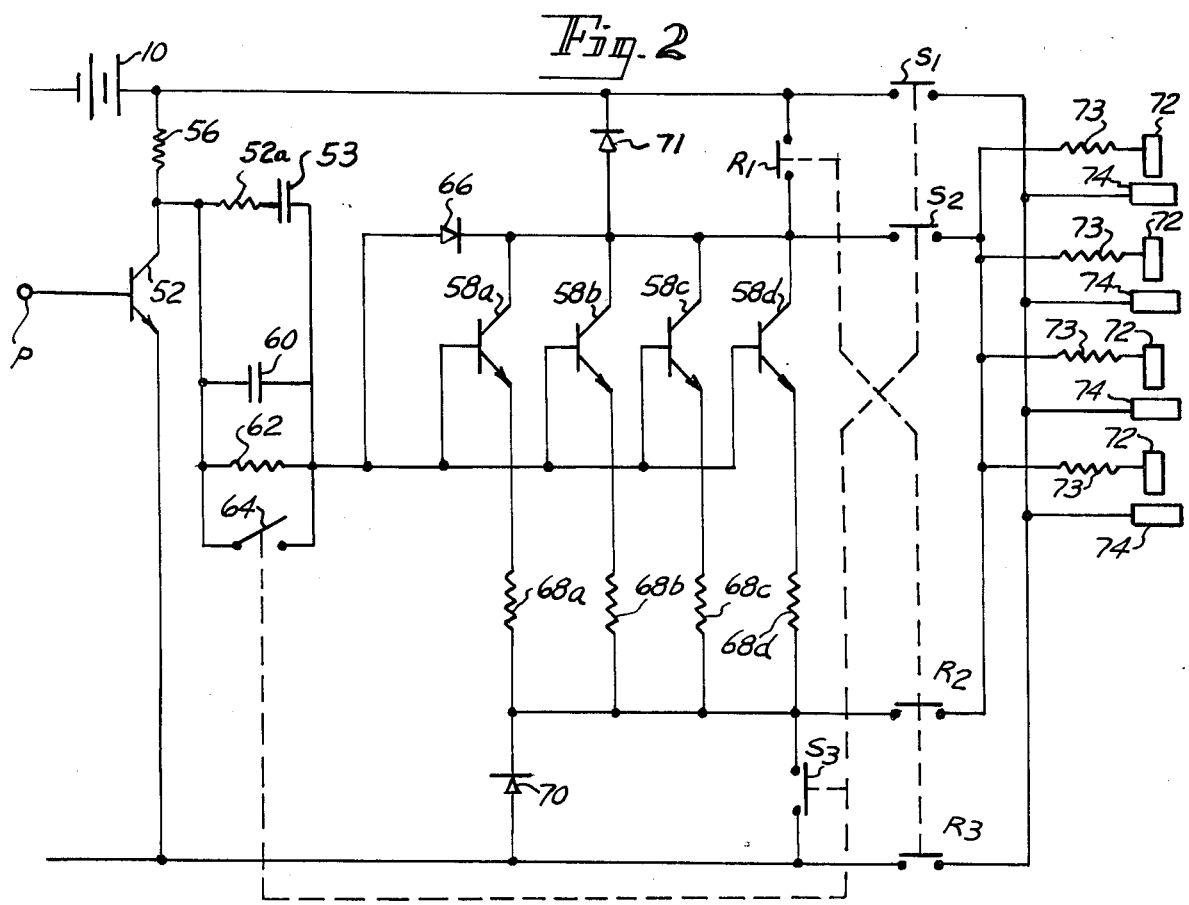

ELECTRICAL DISCHARGE MACHINING POWER CIRCUIT

BACKGROUND OF THE INVENTION

The field to which our invention relates is that known as electrical discharge machining, hereinafter sometimes referred to as "EDM," in which material is removed from an electrically conductive workpiece by the action of electrical gap discharges between one or more tool electrodes and the workpiece. A servo-feed system is employed to provide relative movement and thus to maintain an optimum gap spacing between electrode and workpiece as material is progressively removed from the workpiece. A dielectric coolant fluid is circulated and recirculated, generally under pressure, to the gap throughout the machining operation. For most reliable and dependable results, a power supply of the independent pulse generator type is utilized to provide machining power pulses of precisely controlled frequency and on-off times.

During EDM machining operation, it is sometimes necessary to change the gap polarity in accordance with the selection being made of electrode material and changeover being made with respect to the workpieces being machined. For example, in electrical discharge machining of some workpiece materials, it is desirable to use copper electrodes in which polarity will be "standard," with the electrode being negative and the workpiece being positive. For other workpiece materials, it is preferred to use graphite electrodes in which case the polarity will be that commonly referred to as "reverse," when the electrode is positive and the workpiece negative. In any machining power supply having the capability of polarity changeover through relay or other similar switching arrangement, it is essential that the output transistors be triggered both on and off with a clean, square wave triggering pulse. This is accomplished by generating and applying two out-of-phase signals from the multivibrator.

SUMMARY OF THE PRESENT INVENTION

The present invention will be seen to relate to a novel push-pull drive stage and method of generating triggering pulses used in conjunction with a transistorized electrical discharge machining power supply in which the output from the pulse generator, i.e. multivibrator, is taken in two lines and changed into two separate out-of-phase signals. These signals are passed through an operational amplifier stage and then buffered and passed through two separate branches to provide the controlled triggering of an intermediate high current driver stage. The square wave output pulses from the driver stages are used to turn on and turn off the output transistors.

BRIEF DESCRIPTION OF THE DRAWINGS

Reference is now made to the accompanying drawings for a description of the circuit incorporating the present invention, with like numerals used to identify like parts as they may appear in the circuit. The drawings are combined schematic and block diagrammatic showings of a complete electrical discharge machining power supply circuit, wherein:

FIGS. 1 and 2 are combined block diagrammatic and schematic drawings showing the EDM power circuit;

DESCRIPTION OF THE PREFERRED EMBODIMENT

Referring now to FIGS. 1 and 2, these show the electrical discharge machining power supply circuit with certain parts of the circuit shown in block diagrammatic form in the interest of brevity. A main machining DC power source 10 is shown in FIG. 2. It will be understood that the main DC source for electrical discharge machining power supply is usually derived from an AC source input with a full wave rectifier and a filter included. The source of triggering pulses for the power supply circuit is shown in block form as a multivibrator 11. An example of one type of multivibrator which is well known to the prior art and suitable for incorporation in the present circuit is illustrated in U.S. Pat. No. 3,854,026 for "Gated Timing System for Electrical Discharge Machining" issued on Dec. 10, 1974, and of common ownership herewith. The $\overline{MVB}$ and MVB signals from the multivibrator 11 are passed to an intermediate operational amplifier 13 and thence through the remainder of the circuit of FIG. 1, which may be functionally described as a drive stage 15 for the electrical discharge machining power supply circuit. The operational amplifier 13 may be incorporated as a Model LM311 comparator manufactured and sold by National Semiconductor Corporation of Santa Clara, Calif. By supplying two out-of-phase signals to the amplifier 13, it receives a differential signal of about 5 volts and eliminates the effect of noise feedback on the lines in the power supply circuit.

Figure 4:
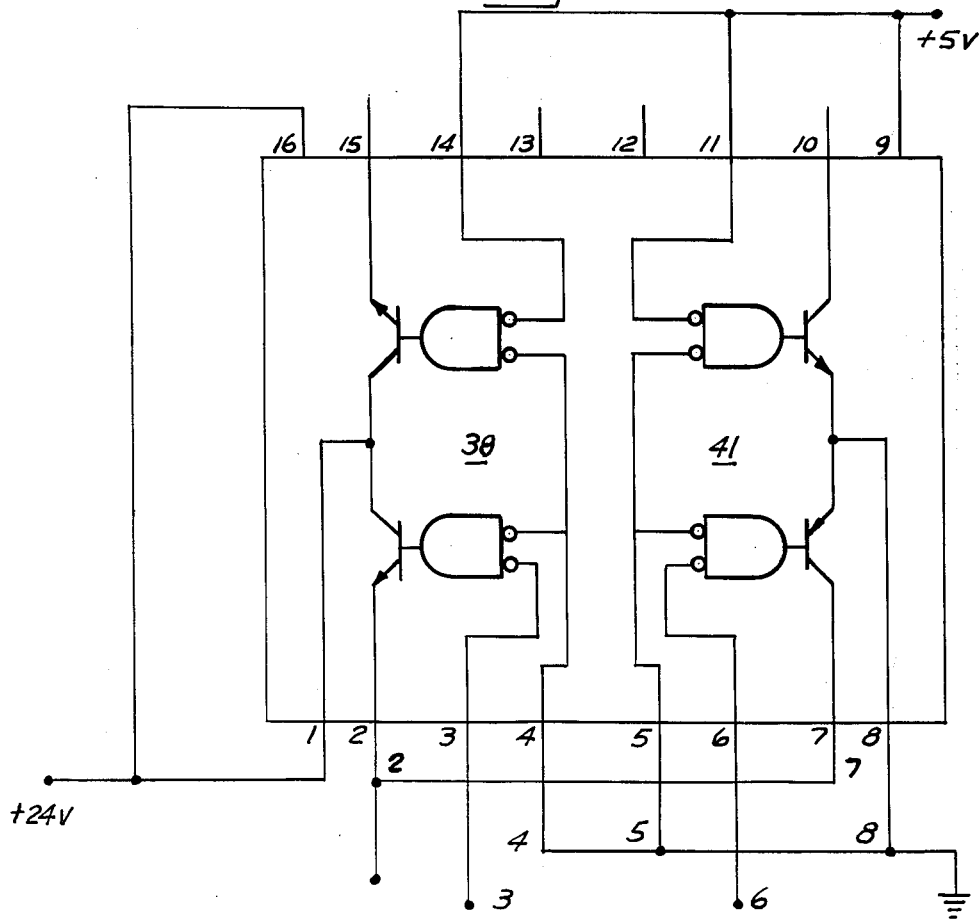
FIG. 4 is a schematic showing of the high current output driver used in the circuits of FIGS. 1 and 2.

Included in the drive stage 15 are a plurality of inverter gates 17, 19, 21, 23, and also inverter gates 25 and 27. These inverter gates are well known in the electronic arts and may be embodied, for example, as Model No. 7404 hex inverters of the type also manufactured and sold by National Semiconductor Corporation of Santa Clara, Calif. It will be seen that the output from the first inverter gate 17 passes through upper and lower branches which include in each case a pair of delay networks; diode 29-capacitor 31, diode 33 and its associated capacitor 35. Next following the drive stage 15 is a high current output push-pull driver stage which may be incorporated as a high current output driver Z5 of the monolithic type currently manufactured and sold as Model LM5325 by the aforesaid National Semiconductor Corporation. The high current driver Z5 includes input terminals A and B and the detail of the schematic of the driver Z5 is shown in FIG. 4 and described hereinafter.

Also associated with the high current driver Z5 is the output terminal C taken from output terminals 7 and 2 as shown, with an RC network 37 connected between it and the next following transistor 52. Plus biases of 5 volts and 24 volts are likewise connected to the driver Z5 in the manner shown. A resistor 39 is connected in circuit as shown. Other terminals, namely, 4, 5 and 8 are connected to ground as better shown in FIG. 4 hereinafter.

The output bank of transistors, the polarity switching relays and the gap leads are shown in FIG. 2. The drive signal from point P is passed to the base of the transistor 52. A load resistor 56 is shown connected in series with the collector of the transistor 52. The final portion of the power supply is the output transistor bank which includes a plurality of NPN types transistors 58a, 58b, 58c and 58d. While the circuit illustrating the present invention employs transistors as electronic switches, the invention is not intended to be so limited, but with proper redesign of the circuit and its components by one skilled in the art, other electronic switches may be substituted for the transistors.

The triggering pulses taken from the collector of the transistor 52 are then passed through a first parallel RC network including a capacitor 60 and a resistor 62, and a second network including resistor 52a a and capacitor 53. A switch 64 is included for a purpose to be explained hereinafter. A diode 66 is also connected across the collector and base junctions of the several output transistors. A resistor is connected in series with the emitters of each of the transistors 58a–58d, with the numerals 68a, 68b, 68c and 68d being applied to the respective resistors. A pair of clamping diodes 70 and 71 are included in the gap circuit. A series limiting resistor 73 is shown connected in series with each separate gap. The actual machining gap circuit includes four electrodes 72, which may have a common opposed workpiece 74 or, as illustrated, the four electrodes 72 may be used to machine concurrently four cavities in four separate workpieces 74.

In the embodiment of the invention illustrated, four coolant filled gaps are in operation at all times as machining is carried on. The polarity reversal switches, which are preferably relay operated, are illustrated all in the open position preparatory to the selection of either polarity of machining. Those switches which are closed during reverse polarity, that is, with the electrode positive and the workpiece negative, are identified by the letter R, while those switches which are closed during the opposite standard polarity operation are identified by the letter S. The switch 64 is shown operable in ganged relationship with the S or standard polarity switches. During the standard polarity connection, the switch 64 will be placed in the open position, whereas in reverse polarity operating condition, the switch 64 will be held closed.

During standard polarity operation, all of the switches S1, S2 and S3 will be relay actuated and placed in their closed position. The S1 switch will serve to connect the positive voltage source indicated at the terminal 10 to each of the workpieces 74 at the right hand side of the drawing of FIG. 2. At the same time, the contacts of switch S2 will be closed to connect each of the electrodes 72 to the collector bus of the output transistors 58a–58d. In addition, the switch S3 will be closed to connect the emitters of each of the output transistors 58a–58d to ground. It will thus be seen that with the single switching of three switch movable contact sets, it is possible to preset the polarity of an almost unlimited number of machining gaps.

In the reverse polarity condition, the switches S1, S2 and S3 are left in a normally open position, while the switches R1, R2 and R3 are closed to alter the connections to the gaps to the opposite condition. Otherwise stated, the positive voltage at the terminal of DC source 10 is passed through each of the output transistors 58a–58d, collector to emitter through the associated emitter load resistors 68a–68d, and thence to each of the electrodes 72 and across the associated gap, with the return in each case being through the switch R3 to ground.

The switch 64, as already indicated, is ganged either with a relay or common operator for the S switches or the R switches in such manner that the switch 64 is open during standard polarity and closed during reverse polarity to control the triggering input to the base of the output transistors 58a–58d. If the output transistors 58a–58d are operated in the high impedance emitter follower configuration, it may be desirable to have the switch 64 closed. In accordance with the arrangement of the several gaps in one polarity or the other, it is exceedingly difficult to drive the output transistors 58a–58d and to provide an appropriate output average current at the high frequencies required, which range upward of 50-200 KHz in normal machining operation. The problem, of course, is based on the fact that a transistor may be turned on rapidly but turning it off as rapidly is more difficult. It is further important to note that the combination of gap circuits and the unavoidable lead lengths in these circuits give rise to a greatly variable and high inductive circuit. There is always a considerable amount of oscillation to deal with because of the feedback in the leads between the gap elements, the electrode 72 and workpiece 74 and the power supply circuit.

Figure 3:
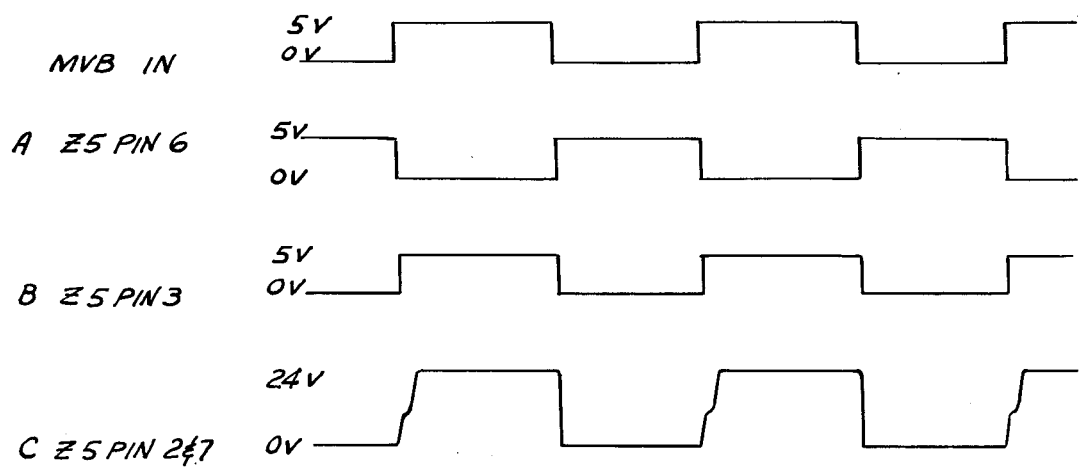
FIG. 3 is a voltage waveform diagram illustrating the mode of operation of the driver stage.

Reference is now made to the voltage waveform of FIG. 3 to clarify the operation of the drive stage 15 and its relationship to the entire electrical discharge machining power supply circuit. It will be seen that there are a pair of out-of-phase outputs from the multivibrator 11. Normally the MVB signal would be at ground and the $\overline{\text{MVB}}$ would be positive. A following operational amplifier 13 is used to provide a square wave output with clean leading and trailing edges on each pulse. The signal is then passed through the first inverter gate 17 and then passed through two parallel branches to provide buffering. In the lower separate branch, including inverter 25, the same signal is brought out to provide an out-of-phase signal, also with some buffering. In each branch, a diode capacitor network, as shown, including diode 29-capacitor 31 and diode 33-capacitor 35, is used to give a predetermined amount of lag or delay. This is required because of the exceedingly high speed operation of the following high current driver stage Z5. As previously indicated, the high current driver, as better shown in FIG. 4, has two pull-up sections 38 and two pull-down sections 41, each fed by a set of AND inverter gates with negative inputs. The resistor 39 is in series with both the pull-up and pull-down sections because, if for any reason these become turned on at the same time, it would destroy the chip. We thus have two outputs, one that goes to plus and one that goes to ground and, with respect to FIG. 4, one section cannot be turned ON before the other is turned OFF. It will thus be seen that the drive circuit 15 and the high current driver Z5, in accordance with the present invention, eliminates a large number of individual and separate driver stages previously required in electrical discharge machining power circuits.

Again with reference to FIG. 3, there are provided inverted triggering input pulses through the pins 3 and 6 of the driver Z5. The inverted triggering pulses are provided to these two inputs of the driver Z5 and the resultant triggering pulse output from the pins 2 and 7 of the driver Z5 are best shown in the bottom line of the FIG. 3 waveforms.

In this manner, the output bank of transistors 58a–58d are sharply turned both on and off independently of the gap polarity which is readily switchable from one state to another and further independently of the lead length that may have been incorporated in the system by adding or subtracting different gap or electrode leads.

It will thus be seen that we have provided by our invention a substantially improved and advanced electrical discharge machining power circuit, particularly with respect to the triggering pulses and the specialized type drive stage used in the circuit.

We claim:

1. In an electrical discharge machining apparatus for machining a conductive workpiece by means of electrical discharges between an electrode and a workpiece across a dielectric filled gap, a source of unidirectional voltage, a pulse generator, an electronic switching means operatively connected between the source and the gap for providing said discharges a means connected to the pulse generator output for developing a turn-on signal for said switch, a means connected to the pulse generator output for developing a turn-off signal for said switch out-of-phase with said turn-on signal, and a high current driver means having its inputs connected to and operable by the combined aforesaid signals for providing a square wave pulse for triggering said switching means on and off, said means for developing said out-of-phase signals comprising a pair of parallel branches, each having a different number of inverter stages serially connected therein for providing the out-of-phase relationship between said signals.

2. The combination as set forth in claim 1 wherein there is further connected a lag network in each of the aforesaid parallel branches.

3. The combination as set forth in claim 2 wherein said lag network comprises in each case a diode-capacitor network connected in series with said inverters.

4. The combination as set forth in claim 1 wherein there is further connected intermediate said parallel branches and said pulse generator an operational amplifier for developing a square wave pulse train and supplying it to said branches.

5. In an electrical discharge machining apparatus for machining a conductive workpiece by means of electrical discharges between an electrode and a workpiece across a dielectric filled gap, a source of voltage, a transistor connected in series with said source and said gap, a pulse generator, and a drive stage connected intermediate said pulse generator and said transistor, said drive stage further including a pair of parallel branches each branch having a different set of series inverters for providing square wave out-of-phase signals from the pulse generator output, and a high current push-pull driver device having a pair of input terminals connected intermediate said branches and its output coupled to said transistor for providing turn-on and turn-off of said transistor.

6. The combination as set forth in claim 5 wherein a delay network is operatively connected in each of the aforesaid branches.

* * * * *